United States Patent
Quek et al.

[19]

[11] Patent Number: 5,832,566
[45] Date of Patent: Nov. 10, 1998

[54] FRICTION HINGE DEVICE

[75] Inventors: Soo Huat Quek, Chengam; Ting Yeow Hoong, Singapore, both of Singapore

[73] Assignee: Hewlett-Packard Company, Palo Alto, Calif.

[21] Appl. No.: 535,412

[22] Filed: Sep. 28, 1995

[51] Int. Cl.⁶ .................................................. E05C 17/64
[52] U.S. Cl. ............................................................ 16/342
[58] Field of Search ........................... 16/342, 338, 337; 361/683, 681, 682; 364/708.1; 248/917–923; 403/351, 365, 371

[56] References Cited

U.S. PATENT DOCUMENTS

| | | | |
|---|---|---|---|
| 540,707 | 6/1895 | Wolf | 16/342 |
| 4,489,974 | 12/1984 | Warhol | 16/342 |
| 4,620,344 | 11/1986 | Lewis | 16/337 |
| 4,639,147 | 1/1987 | Schwarz | 16/342 |
| 4,999,878 | 3/1991 | Baer | 16/354 |
| 5,491,874 | 2/1996 | Lowry et al. | 16/342 |
| 5,503,491 | 4/1996 | Lu | 248/921 |

FOREIGN PATENT DOCUMENTS

| | | |
|---|---|---|
| 2691743 | 5/1992 | France . |
| 2266920 | 5/1992 | United Kingdom . |

*Primary Examiner*—Daniel W. Howell
*Assistant Examiner*—Mark Williams

[57] ABSTRACT

This invention relates to a hinge device which is adapted to provide pivotal connection between parts of casings, particularly for portable computing devices. The hinge device consists of an outer housing member and an inner shaft. Non-metallic frictional material is disposed about the shaft. The frictional material is rotatable within the housing member. Lateral surfaces of the shaft are either distanced from inner surfaces of housing member or are separated by the frictional material. The housing member and shaft are connected to different parts of a casing such that rotation of the shaft within the housing member causes pivotal motion between the parts. The parts can be releasably fastened in selected pivotal orientations due to friction generated between the frictional material and the inner surfaces of the housing member. The invention also relates to a computing device incorporating such a hinge device.

26 Claims, 4 Drawing Sheets

FRICTION HINGE DEVICE

FIELD OF THE INVENTION

This invention relates to hinge devices which are adapted to provide pivotal connection between parts of casings. The invention relates particularly, but not exclusively, to hinge devices used in the casings of portable computing devices.

BACKGROUND

Hinge devices are used for providing pivotal connection between different parts of casings of an apparatus. In certain applications, these pivoting parts must also have the capability of being held fast intermittently with respect to one another in varying orientations. As an example, in a portable computer having a tiltable lid, the lid is capable of being tilted through a range of angles, but is able to remain fixed in a particular inclination that the user selects to provide optimum visibility of the computer screen. In order for a hinge device to be intermittently held fast in a variety of selected orientations, a certain degree of internal friction must be present within the hinge device. In the example of the portable computer, the amount of internal friction must be sufficient to secure the lid in a selected angle of inclination when the user does not move the lid. The amount of friction, however, must not be so great as to cause difficulty when moving the lid intentionally.

Moving parts within a hinge device must maintain high dimensional accuracy and must fit together precisely. However, the presence of such internal friction between moving parts of a hinge device may cause the parts to lose their original alignment through wear caused by the friction. Over the long term life of a hinge device, misalignment may also result from the frictional forces acting to move the parts out of their original alignment.

SUMMARY OF THE INVENTION

According to one aspect of the present invention, there is provided a hinge device for pivotally connecting first and second parts of a casing. The hinge device comprises an outer housing member which defines a hollow portion. The hinge device is also has an inner shaft member that is provided with lateral surfaces and non-metallic frictional material disposed about the shaft member. The frictional material is frictionally and rotatably positioned within the hollow portion of the outer housing member in substantial co-axial alignment. The lateral surfaces of the inner shaft member are distanced from the outer housing member. The outer housing member and the inner shaft member are each adapted for connection to one of the first and second parts of the casing, such that rotation of the inner shaft member within the hollow portion causes pivotal motion between the parts of the casing. The parts are able to be releasably positioned at plural oblique and acute pivotal orientations with respect to one another due to friction between the frictional material and the hollow portion.

Preferably, regions of the lateral surfaces of the inner shaft member are distanced from the outer housing member by space therebetween, and other regions of the lateral surfaces are distanced by being separated by the frictional material from the outer housing member.

Preferably, the frictional material is disposed so as to be substantially motionless with respect to the inner shaft member and is rotatable with respect to the hollow portion of the outer housing member when the inner shaft member rotates within the hollow portion.

Preferably, the frictional material is characterised in that it provides higher lubricity when the inner shaft member rotates within the hollow portion of the outer housing member at higher speeds, but provides lower lubricity when the rotation is at lower speeds.

The frictional material may also be characterised in that it provides lower friction at higher speeds, but provides higher friction at lower speeds.

Preferably, the frictional material has a degree of resilience sufficient to allow the frictional material to releasably grip the outer housing member when the inner shaft member is stationary within the hollow portion of the outer housing member.

Preferably, the inner shaft member is provided with a locking mechanism for locking the frictional material to the inner shaft member such that the frictional material is substantially motionless with respect to the inner shaft member.

Preferably, the frictional material and the inner shaft member are each provided with a locking mechanism configured to mutually engage the frictional material and the inner shaft member which causes the frictional material to be substantially motionless with respect to the inner shaft member.

Preferably, the locking mechanism of the frictional material defines a hollow region shaped so as to allow the locking mechanism of the inner shaft member to fit therethrough.

Preferably, each of the outer housing member and the inner shaft member is provided with a connector mechanism to allow connection of each member to one of the different parts.

Preferably, the connector mechanism of the outer housing member may be in the form of a lever arm that protrudes radially from the outer housing member such that application of a force to the lever arm causes the outer housing member to rotate about its axis.

Alternatively, the connector mechanism of the inner shaft member may be in the form of a lever arm that protrudes radially from the inner shaft member such that application of a force to the lever arm causes the inner shaft member to rotate about its axis.

The connector mechanism may also comprise a slot that is transverse to the rotational axis of the member such that rotation of the slot causes the member to rotate about its axis.

According to another aspect of the invention, there is provided a computing device having a casing which includes first and second moving parts. The computing device comprises an outer housing member which defines a hollow portion. The hinge device is also has an inner shaft member that is provided with lateral surfaces and non-metallic frictional material disposed about the shaft member. The frictional material is frictionally and rotatably positioned within the hollow portion of the outer housing member in substantial co-axial alignment. The lateral surfaces of the inner shaft member are distanced from the outer housing member. The outer housing member and the inner shaft member are each adapted for connection to one of the first and second parts of the casing, such that rotation of the inner shaft member within the hollow portion causes pivotal motion between the parts of the casing. The parts are able to be releasably positioned at plural oblique and acute pivotal orientations with respect to one another due to friction between the frictional material and the hollow portion.

An object of the present invention is to minimise the adverse effects of internal friction which, necessarily, has to be present in hinge devices that enable components to be pivoted and intermittently fixed in a range of selected pivotal orientations.

BRIEF DESCRIPTION OF THE DRAWINGS

In order that the invention might be more fully understood, a preferred embodiment of the invention will be described, by way of example only, with reference to the accompanying drawings, in which.

DESCRIPTION OF THE PREFERRED EMBODIMENTS

Figure 1:
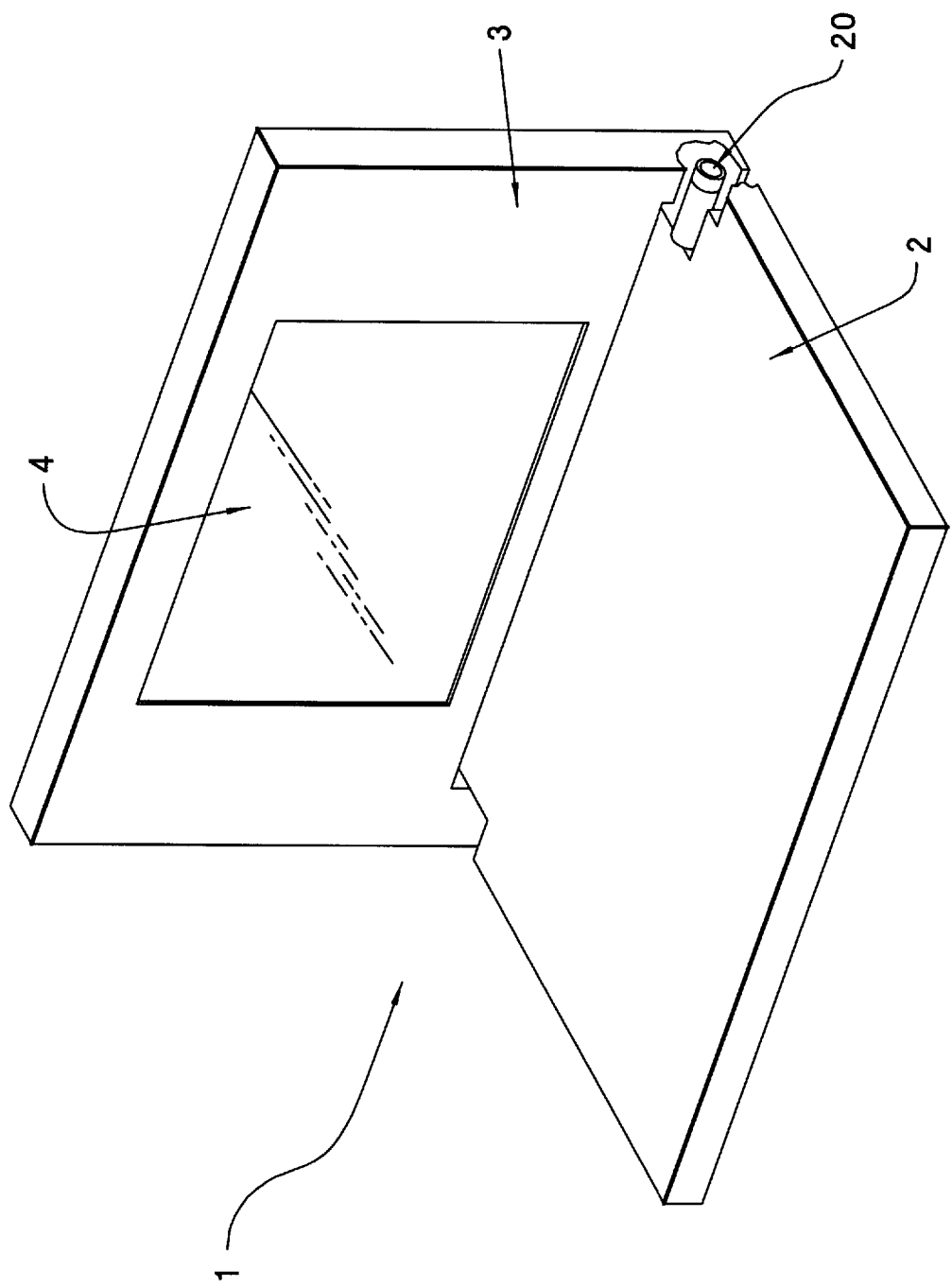
FIG. 1 is a schematic diagram of a portable computer that incorporates a hinge device which is constructed in accordance with an embodiment of the invention.

Referring to the drawings, FIG. 1 illustrates a hinge device constructed in accordance with an embodiment of the invention in the form of hinge 20. The hinge 20 is incorporated, by way of example, in a portable computer 1.

It is understood that the invention may be incorporated in other types of appliances and apparatus that utilise such tiltable lids or components, such as electronic calculators, video recorders, portable televisions that use liquid crystal displays, and the like. The invention is particularly relevant to appliances or apparatus which incorporate a component that is able to be tilted and positioned in a range of orientations to suit the preference of a user. However, for convenience, the concepts of the present invention are illustrated, by way of example only, in a hinge device that is incorporated in the casing a portable computer.

The computer 1 has a casing which comprises a computer body 2 that is pivotally connected to a computer lid 3. The computer lid 3 is pivotally connected to the computer body 2 by means of the hinge 20.

The hinge 20 allows the lid 3 to be tilted and positioned with respect to the computer body 2, in an almost unlimited range of inclinations between a closed position and a maximum tilt position. The lid 3 of the portable computer 1 houses a computer screen 4. A user is able to tilt the lid 3 to an inclination that provides optimum visibility of the screen 4.

Figure 2:
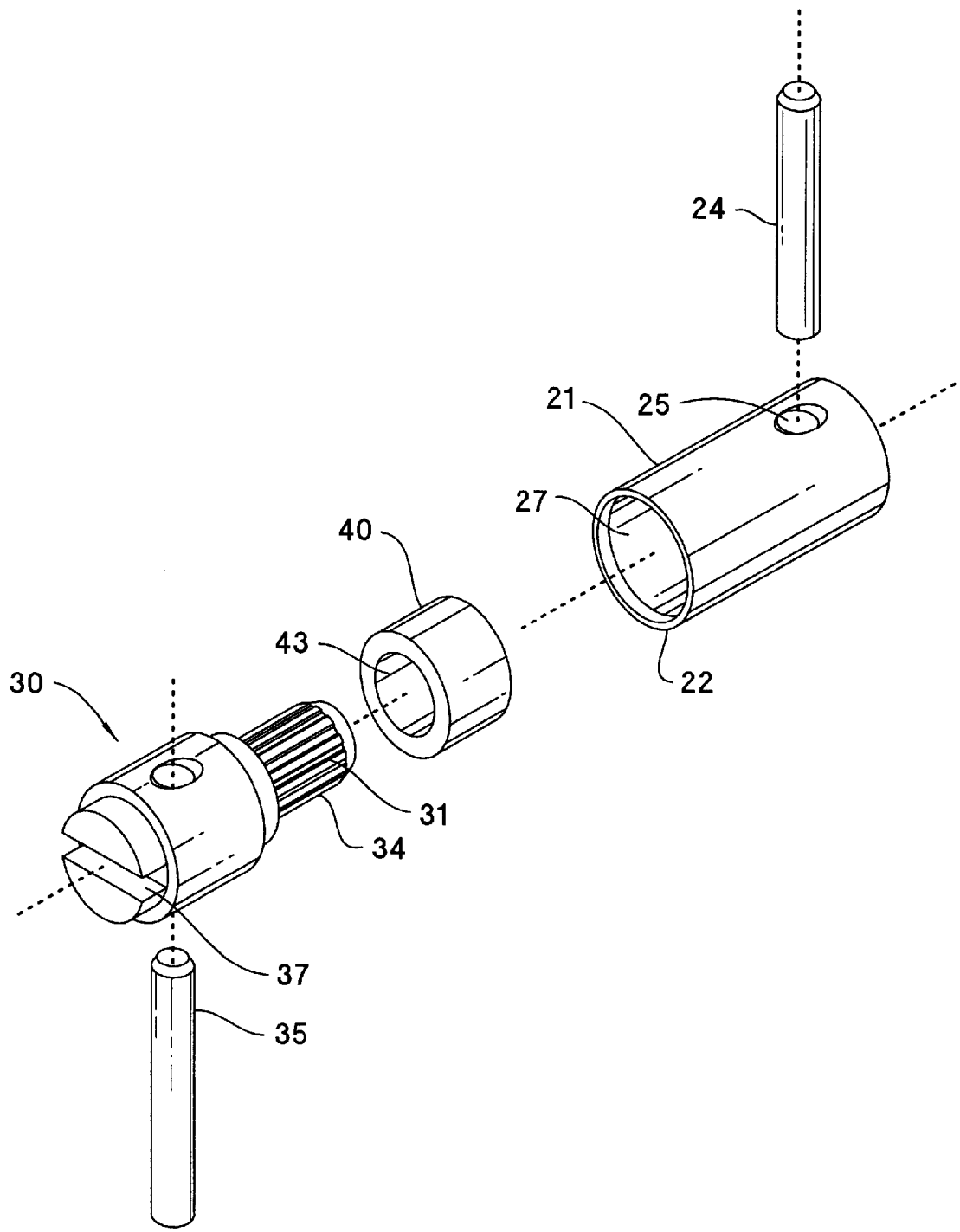
FIG. 2 is an exploded view of various components of the hinge device of FIG. 1.

FIG. 2 shows an exploded schematic view of various components of the hinge 20 The hinge 20 consists of an outer housing member in the form of a hollow cylindrical hub 21. The hinge 20 also consists of non-metallic frictional material in the form of a cylindrical bushing or sleeve 40, and an inner shaft member in the form of an inner shaft 30. The inner shaft 30 has an axis of rotation, indicated in FIG. 3 as A—A. The hub 21 also has an axis of rotation. The rotational axes of the hollow portion 27 of the hub 21, the bushing 40 and the inner shaft 30 are all substantially in co-axial alignment. Since the hub 21 and inner shaft 30 are substantially in co-axial alignment, the axis of rotation of the hub 21 is also indicated in FIG. 3 as A—A.

Figure 3:
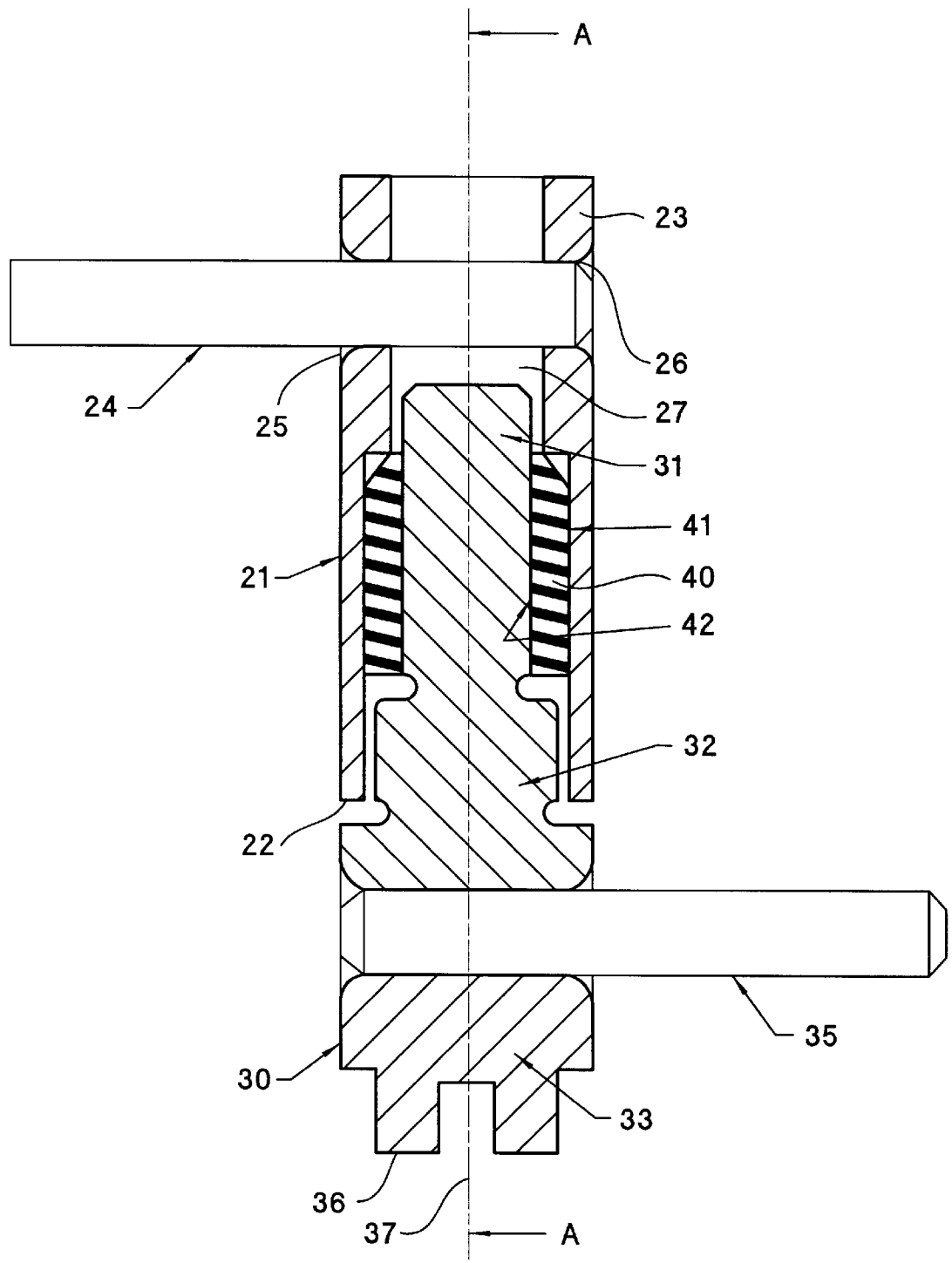
FIG. 3 is an axial cross-sectional view of the hinge device of FIG. 1.

FIG. 3 shows an axial cross-sectional view of the hinge 20, illustrating the engagement of the hub 21, the bushing 40 and the inner shaft 30. The cylindrical hub 21 is provided with a hollow portion 27 which consists of two regions of differing internal cross-sectional diameter. The lower end of the hub 21 is formed with a lower circumferential rim 22.

Referring to FIG. 3, the inner shaft 30 consists of regions of differing external cross-sectional diameter, comprising an upper section 31, a middle section 32 and a lower section 33, each having a successively larger cross-sectional diameter respectively.

The inner shaft 30 has a portion, consisting of the upper 31 and middle 32 sections, which is rotatably positioned within the hollow portion 27 of the cylindrical hub 21. The cylindrical bushing 40 is disposed about the periphery of the upper section 31 of the inner shaft 30. Hence, the bushing 40 is able to rotate within the hollow portion 27 of the hub 21.

It is important that metal to metal contact between lateral surfaces of the inner shaft 30 and the inner surface of the hub 21 be avoided. No matter how precisely the components are assembled together, there may be a slight axial misalignment between the hub 21 and the inner shaft 30, since a degree of imperfection is inherent in any manufacturing process.

Problems may arise if lateral surfaces of the inner shaft 30 were to be in contact with the inner surface of the hub 21. Although most of the applied and reactionary forces between the hub and lateral surfaces of the inner shaft would be in the form of radial force components acting transverse to the axis A—A, any slight axial misalignment between these components may produce a very small vertical force component acting substantially parallel to the axis. Over a period of time, such vertical force components, acting on the hub 21, may cause the hub to move upwardly along the axis, thereby losing its original alignment with respect to the inner shaft 30. The two components may consequently work loose of each other. Hence, it is essential that any lateral surfaces of the inner shaft 30 are distanced from the inner surfaces of the hub 21. Regions of the lateral surfaces of the inner shaft 30 are distanced from the inner surface of the hub 21 by a gap or space in between the components. Other regions of the lateral surfaces of the inner shaft 30 may be distanced from the inner surface of the hub 21 by being separated by the non-metallic bushing 40, so as to avoid metal to metal contact.

Another disadvantage of having metal to metal contact is that wear residue may be produced in the form of metallic particles. Over time, this residue may itself become a major cause of wear of the moving parts of the hinge 20. Avoidance of metal to metal contact may therefore minimise the occurrence of metallic wear particles.

In the present embodiment, the hub 21 and the inner shaft 30 are made of stainless steel, although other suitable materials may be selected. There is, however, no metal to metal contact between lateral surfaces of the inner shaft 30 and the internal cylindrical wall of the hub 21. The middle section 32 of the inner shaft 30 is of a smaller cross-sectional diameter than the internal diameter of the hub 21, so there is no metal to metal contact because the parts are distanced from each other. There is also no contact between lateral surfaces of the upper section 31 of the inner shaft and inner surfaces of the hub 21, because the upper section 31 is separated from the hub by the non-metallic bushing 40.

Preferably, there should also be no metal to metal contact between the lower circumferential rim 22 of the hub, with the flange 33. However, the prohibition of metal to metal contact is not so critical in the case of transverse surfaces. Even when contact occurs between the rim 22 and the flange 33, as is the case in further embodiments, this flange 33 is not a lateral surface of the inner shaft 30, but is a transverse surface. The effect of metal to metal contact between transverse surfaces does not give rise to the problem associated with vertical force components to such a large extent, as compared to metal to metal contact of lateral surfaces.

While there should be no metal to metal contact between lateral surfaces of the inner shaft 30 and the inner surface of the hub 21, lateral surfaces of the frictional material of the bushing 40 are permitted to contact the inner surface of the hub. Even though there may be slight axial misalignment between the hub 21 and the bushing 40, the relatively higher resilience of the non-metallic frictional material of the bushing may be able to absorb a substantial amount of any vertical force components. Hence, over the life-time of the hinge 20, the presence of the non-metallic bushing 40 helps to preserve the original alignment of the inner shaft 30 relative to the hub 21, by substantially absorbing any vertical force components that may be present.

In the present embodiment, when the inner shaft 30 rotates within the hub 21, the cylindrical bushing 40 is substantially motionless with respect to the inner shaft, but rotates with respect to the inner surface of the hub 21. Hence, friction is generated at the outer surface 41 of the bushing 40 which is in contact with the inner surface of the hub 21, rather than friction being generated at the inner surface 42 of the bushing 40 that is in contact with the inner shaft 30. An advantage in having friction generated at the outer surface 41 of the bushing is that, compared to the inner surface 42 of the bushing, more torque may be generated at the outer surface The reason for this is that torque is a product of force multiplied by the distance of a moment arm. Hence, the amount of torque generated increases proportionally with the distance from the axis A—A. In practical terms, this means that it requires more force to rotate the components when the friction is generated at the outer surface 41 of the bushing. In the example of the portable computer 1, a higher degree of torque required to rotate the inner shaft 30 within the hub 21 is beneficial, because the resistance associated with the higher torque prevents the computer lid 3 from moving out of its set orientation, when the lid 3 (and hence the hinge) is not being moved intentionally by the user.

In the present embodiment, therefore, it is preferred that the bushing 40 is substantially stationary with respect to the inner shaft 30, to ensure that friction is generated at the outer surface of the bushing. This is in contrast to earlier hinge devices, where a bushing is stationary with respect to a hub, and friction is generated at the interface of the bushing and an inner shaft. Such a configuration in earlier hinge devices would provide less resistance to rotational movement because of the lower amount of torque required to rotate the components.

Figure 4A:
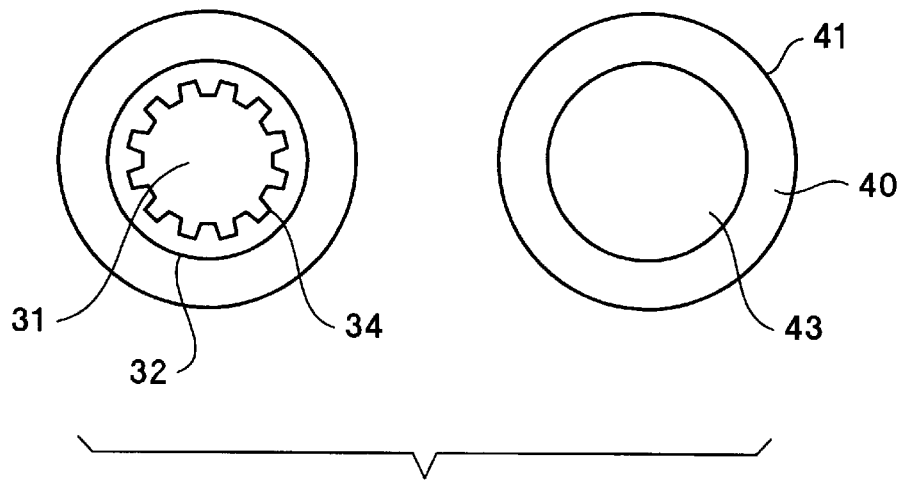
FIGS. 4A, 4B and 4C are radial cross-sectional views of various alternative embodiments of frictional material and inner shaft members that may be incorporated in hinge devices similar to the device of FIG. 1.

This advantage of having the friction generated at the outer surface 41 of the bushing does not depend on the manner in which the bushing is fastened to the inner shaft 30. Hence, the actual manner in which the frictional material is disposed about the inner shaft member is not an essential feature of the invention in its broadest aspect. In the present embodiment, as best seen in FIGS. 2 and 4A, the upper section 31 of the inner shaft 30 may be provided with a locking mechanism in the form of radial teeth 34 which are knurled parallel to the axis A—A of the shaft. These radial teeth 34 serve to secure the bushing 40 to the inner shaft 30. The resilience of the frictional material of the bushing allows the teeth 34 to bite into the bushing to provide a secure grip. In the present bushing and inner shaft of the embodiment, illustrated in FIG. 4A, the hollows cavity 43 of the bushing has a smooth inner cylindrical surface. Once the bushing is fitted over the radial teeth 34, the teeth grip the inner cylindrical surface sufficiently to hold the bushing motionless with respect to the inner shaft. As an alternative to the radial teeth, the upper section 31 of the inner shaft may be provided with a diamond pattern, or chevron-shaped teeth. The actual form of the locking mechanism is not critical, so long as the locking mechanism performs the function of locking the frictional material to the inner shaft member, so that the two are substantially motionless with respect to one another.

Figure 4B:
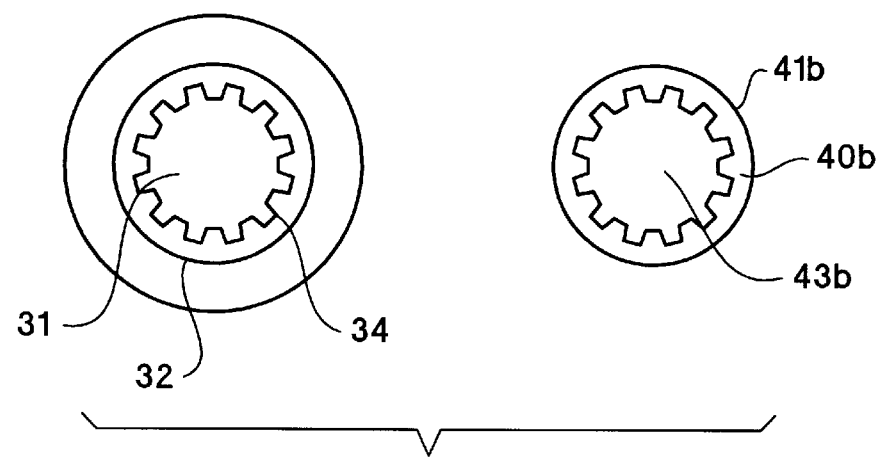
Figure 4C:
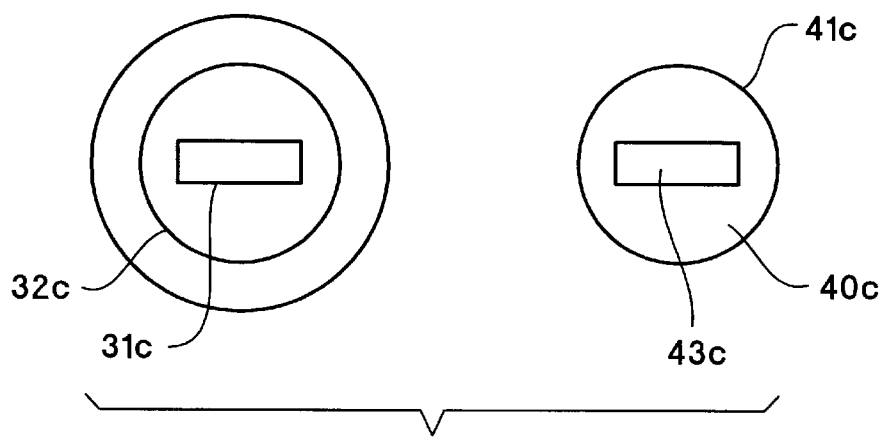

The locking of the bushing 40 to the inner shaft causes the bushing to be substantially motionless with respect to the inner shaft, particularly when the inner shaft is rotated with respect to the hub. However, in an attempt to minimise movement of the bushing on the inner shaft, other forms of locking mechanisms may be contemplated. Referring to FIGS. 4B and 4C, the hollow cavity 43 within the bushing may be shaped to provide fitting engagement with a correspondingly shaped inner shaft 34. The frictional material may be provided with a complimentary locking mechanism, such as a locking mechanism, which is adapted to mutually engage with the locking mechanism found on the inner shaft member. In further embodiments illustrated in FIGS. 4B and 4C, the complementary locking mechanism of the bushing 40 may be in a form that defines a hollow cavity 43b that is shaped to complement the cross-sectional shape of the upper section 31 of the inner shaft, so as to allow the bushing 40 and the upper section 31 to have a fitted engagement.

In the further embodiment illustrated in FIG. 4B, since the cross-sectional shape of the upper section 31 is in the shape of a star that is produced by the radial teeth, the complementary locking mechanism found in the bushing 40 is defined as a hollow cavity 43b having a cross-sectional shape of a star, so as to allow the bushing to be fitted precisely over the upper section 31 of the inner shaft. The star is formed by the radial teeth 34 on the shaft, which are knurled parallel to the axis A—A of the shaft. The parallel knurling allows the bushing to be press-fitted onto the shaft, whereas a knurling that is transverse to the axis may produce some resistance to the step of press-fitting. Another embodiment, such as the one illustrated in FIG. 4C, has the upper section 31c of the shaft 30 being formed as a flat key, and the inner cavity 43c of the bushing being formed as a slot of complementary dimensions, to allow the key to fit within the slot. It is evident that many variations of the manner in which the frictional material is locked to the inner shaft member may be contemplated. It is essential merely that in use, the frictional material may be held substantially motionless with respect to the inner shaft member.

In the present embodiment, the frictional material used in the bushing 40 is an internally lubricated reinforced thermoplastic, being a polyester elastomer containing PTFE at 13 wt. %, and silicone at 2 wt. %. This polyester elastomer may be obtained as catalogue number YL-4530 produced by LNP Corporation of Malvern, Pa. By way of background only, the characteristics of some suitable internally lubricated reinforced thermoplastics are described in Bulletin 254–780 published by LNP Corporation. (The contents of Bulletin 254–780 are not imported into this patent specification). The invention and its preferred embodiments are, of course, not limited to this YL-4530 material. The frictional material of the present embodiment may be any non-metallic material, but preferably one that has the characteristic of providing higher lubricity when the inner shaft 30 rotates within the hollow portion 27 of the hub at higher speeds, while providing lower lubricity when the rotation is at lower speeds. The net effect of such materials is that the frictional material provides lower friction between moving parts at higher speeds, and also provides higher friction at lower speeds.

Quite a variety of frictional materials may be used to provide adequate friction between the outer housing member and the inner shaft member. It is preferred that the frictional material of the bushing has a degree of resilience. This resilience may allow the frictional material to expand and grip the inner surface of the hub, when the inner shaft 30 is stationary within the hub 21. Another characteristic associated with resilient materials is that of compressibility. The relative compressibility of the frictional material may also provide a degree of release when the inner shaft 30 rotates within the hub 21. Hence, there may be a state of gripping and a state of release that allows the hinge 20 to have a function analogous to a clutch mechanism, to selectively position the parts at plural oblique and acute pivotal orientations. In the context of the hinge device being in a computer, this clutch-like function may assist in keeping the lid 3 in its selected orientation when there is no applied force. The state of release may assist the lid to move more smoothly when the lid is being opened or closed.

The frictional material of the bushing 40 should not be metallic, otherwise this would result in a lateral metallic surface, associated with the inner shaft, being in contact with the inner surface of the hub 21. In further embodiments, however, it is conceivable that the inner shaft 30 may be made from a non-metallic material, such as a high strength polymer, such as polyethylene and polyurethane.

The nature of the friction generated between moving parts in the hinge 20 directly affects the ease with which the user is able to cause the lid 3 to pivot. There are contradictory requirements for internal friction within the hinge 20. High internal frictional forces are required to hold the hub 21 in a fixed orientation with respect to the inner shaft 30, particularly when the lid 3 must be maintained at an inclination which the user has selected to provide optimum visibility of the screen 4. Such high frictional forces would also be advantageous when the lid has to be pivoted incrementally, such as when the user wishes to pivot the lid through a small degree of rotation to finely adjust the inclination of the screen 4. On the other hand, the presence of high internal frictional forces between the hub 21 and inner shaft 30 is a disadvantage when the lid 3 has to be moved quickly, such as when the lid is being opened and closed. Such high frictional forces in the hinge 20 would increase the amount of effort required to open and close the lid.

These contradictory requirements may both be satisfied through selection of a frictional material having frictional characteristics that vary with speed. In metal to metal friction, the friction varies according to the load applied to the moving parts. In contrast, friction between a metal and thermoplastic is characterised by adhesion and deformation, which results in frictional forces that vary with the speed of the moving parts. In thermoplastics that incorporate, for example, both Polytetrafluoroethylene (PTFE) and silicone lubricant, it is found that there is continuous lubricity at startup and at high speeds. However, it is found that the lubricity is much less effective at low speeds. Thus, a frictional material that has continuous lubricity at startup and at higher speeds, but less lubricity at lower speeds, exhibits qualities that may satisfy the contradictory requirements for the desirable level friction at lower and higher speeds The continuous lubricity at higher speeds allows the lid 3 to be opened and shut quickly with little frictional resistance from the hinge 20. On the other hand, the lower level of lubricity at lower speeds contributes to a greater amount of resistance which helps the lid 3 maintain its position in a selected inclination. Furthermore, the characteristic of having continuous lubricity at startup means that a "slip and stick" phenomena is avoided. Otherwise, when the lid 3 is first moved from a stationary position, it would result in a jerky movement which is undesirable.

Hence, selection of a frictional material for the bushing 40, such as polyester YL-4530, means that the greatest friction is experienced when the inner shaft is moved slowly with respect to the hub, and the least friction is experienced at startup and also when the inner shaft is moved quickly. In the context of the portable computer 1, the use of such a frictional material for the bushing 40 results in the lid being relatively more difficult to move at lower speeds. This ensures that the lid is more likely to remain firmly in place, once it has been tilted to the preferred inclination. The higher amount of friction at lower speeds means that when the lid is motionless, it has to overcome a greater frictional force in order to creep. The opposite would be true when the lid is moved quickly, such as when the lid is being opened or closed.

The selection of thermoplastic resins may have the added benefit of being able to form the frictional material by injection moulding, which is particularly useful when the bushing 40 has to be formed to incorporate the internal cavity 43 of the locking mechanism, as illustrated in FIGS. 4B and 4C.

The hollow cylindrical hub 21 and the inner shaft 30 are each adapted for connection to different parts of the casing of the computer 1 to provide pivotal connection between these parts. Referring to FIG. 3, the upper section 23 of the hub 21 is provided with a connector mechanism in the form of a protruding lever arm 24. The lever arm 24 passes through two holes 25, 26 that are located radially on mutually opposite walls of the upper section 23 of the hub. The lever arm 24 is positioned normal to the rotational axis of the hub 21, such that application of force to the lever arm may cause the hub to rotate about its axis A—A.

Similarly, the lower section 33 of the inner shaft 30 is also provided with a connector mechanism in the form of a further protruding lever arm 35. This further lever arm 35 engages the lower section 33 in the same manner as the lever arm 24 that is connected to the hub 21. The further lever arm 35 is also positioned normal to the rotational axis of the inner shaft, such that application of a force to the further lever arm 35 may cause the inner shaft 30 to rotate about its axis A—A.

The bottom surface 36 of the inner shaft 30 is also provided with a connector mechanism in the form of a transverse slot 37, which is designed to engage with a key (not shown) that is located within the casing of the computer 1. The slot 37 is transverse to the rotational axis of the inner shaft, such that rotation of the key within the transverse slot 37 imparts a rotational movement to the inner shaft, causing it to rotate about its axis. The provision of more than one form of connector mechanism serves to distribute the force that is applied to the inner shaft 30. In further embodiments, the hub 21 may also be provided with more than one form of connector mechanism. In some embodiments, the use of a connector mechanism exclusively in the form of the transverse slot may result in a space-saving advantage, since this mechanism performs a similar mechanical function as each of the protruding lever arms 24, 35, while taking up less space. This would be advantageous in embodiments of the invention which are used in casings that are small in size, such as a palmtop computing device.

When the hinge 20 is incorporated in the portable computer 1, the hub 21 is connected to the computer body 2 by means of the protruding lever arm 24. The inner shaft 30 is connected to the computer lid 3 by means of the further protruding lever arm 35 and the transverse slot 37. Hence, the computer lid 3 is able to pivot with respect to the computer body 2, by virtue of the fact that these components of the computer are connected to the inner shaft 30 and hub 21 respectively, which are able to rotate with respect to one another.

The invention in its broadest aspect is not limited to particular forms of connector mechanisms. A variety of designs of connector mechanisms may be contemplated which are able to provide connection of the outer housing member and inner shaft member to different parts of a casing. In an alternative embodiment, both the inner shaft 30 and the hub 21 are provided with a connector mechanism only in the form of the transverse slot 37, without making use of any protruding lever arm.

We claim:

1. A hinge device for pivotally connecting first and second parts of a casing, said device comprising:

an outer housing member defining a hollow portion;

an inner shaft member, said inner shaft member being positioned within said hollow portion of said outer housing member in substantial co-axial alignment therewith; and a non-metallic frictional material fixed to said inner shaft member and disposed thereabout, said frictional material being frictionally and rotatably positioned within said hollow portion of said outer housing member in substantial co-axial alignment therewith;

wherein said outer housing member and said inner shaft member are each adapted for connection to one of said first and second parts of said casing such that rotation of said inner shaft member within said hollow portion causes pivotal motion between said parts with said frictional material providing lower friction at higher rotation speeds and higher friction at lower rotation speeds, said parts being able to be releasably positioned at plural oblique and acute pivotal orientations with respect to one another due to friction between said frictional material and said hollow portion.

2. A hinge device according to claim 1 wherein said inner shaft member defines lateral surfaces, predetermined regions of said lateral surfaces being distanced from said outer housing member by open space therebetween, and other regions of said lateral surfaces being distanced from said outer housing member by said frictional material therebetween.

3. A hinge device according to claim 1 wherein said frictional material is characterised in that it provides higher lubricity when said inner shaft member rotates within said hollow portion of said outer housing member at higher speeds, but provides lower lubricity when the rotation is at lower speeds.

4. A hinge device according to claim 1 wherein said frictional material has a degree of resilience sufficient to allow said frictional material to releasably grip said outer housing member when said inner shaft member is stationary within said hollow portion of said outer housing member.

5. A hinge device according to claim 1 wherein said frictional material is characterized in that it provides higher lubricity when said inner shaft member rotates within said hollow portion of said outer housing member at higher speeds, but provides lower lubricity when the rotation is at lower speeds, and wherein said frictional material has a degree of resilience sufficient to allow said frictional material to releasably grip said outer housing member when said inner shaft member is stationary within said hollow portion of said outer housing member.

6. A hinge device according to claim 1 wherein said inner shaft member is provided with a locking mechanism for locking said frictional material to said inner shaft member such that said frictional material is substantially motionless with respect to said inner shaft member.

7. A hinge device according to claim 1 wherein said frictional material and said inner shaft member are each provided with a locking mechanism configured to mutually engage said frictional material and said inner shaft member which causes said frictional material to be substantially motionless with respect to said inner shaft member.

8. A hinge device according to claim 7 wherein said locking mechanism of said frictional material defines a hollow region shaped so as to allow said locking mechanism of said inner shaft member to fit therethrough.

9. A hinge device according to claim 1 wherein each of said outer housing member and said inner shaft member is provided with a connector mechanism to allow connection of each member to a different one of said first and second parts.

10. A hinge device according to claim 9 wherein said connector mechanism of said outer housing member is in the form of a lever arm that protrudes radially from said outer housing member such that application of a force to the lever arm causes said outer housing member to rotate about its axis.

11. A hinge device according to claim 9 wherein said connector mechanism of said inner shaft member is in the form of a lever arm that protrudes radially from said inner shaft member such that application of a force to the lever arm causes said inner shaft member to rotate about its axis.

12. A hinge device according to claim 9 wherein said connector mechanism comprises a lever arm that is transverse to the rotational axis of the outer housing member such that rotation of said lever arm causes said outer housing member to rotate about its axis.

13. A hinge device according to claim 1 wherein said inner shaft member defines lateral surfaces, predetermined regions of said lateral surfaces being distanced from said outer housing member by space therebetween, and other regions of said lateral surfaces being distanced from said outer housing member by said frictional material therebetween, and wherein said frictional material is disposed so as to be substantially motionless with respect to said inner shaft member as is rotatable with respect to said hollow portion of said outer housing member when said inner shaft member rotates within said hollow portion, and wherein said frictional material has a degree of resilience sufficient to allow said frictional material to releasably grip said outer housing member when said inner shaft member is stationary within said hollow portion of said outer housing member, and wherein said frictional material is characterized in that it provides higher lubricity when said inner shaft member rotates within said hollow portion of said outer housing member at higher speeds, but provides lower lubricity when the rotation is at lower speeds, and wherein said frictional material has a degree of resilience sufficient to allow said frictional material to releasably grip said outer housing member when said inner shaft member is stationary within said hollow portion of said outer housing member, and wherein said inner shaft member is provided with a locking mechanism for locking said frictional material to said inner shaft member such that said frictional material is substantially motionless with respect to said inner shaft member.

14. A computing device comprising:

a casing including first and second moving parts;

an outer housing member defining a hollow portion;

an inner shaft member provided with lateral surfaces, said inner shaft member being positioned within said hollow portion of said outer housing member in substantial co-axial alignment therewith; and a non-metallic frictional material fixed to said inner shaft member and disposed thereabout, said frictional material being frictionally and rotatably positioned within said hollow portion of said outer housing member in substantially co-axial alignment therewith;

wherein said lateral surfaces of said inner shaft member are distanced from said outer housing member; and wherein said outer housing member and said inner shaft member are each adapted for connection to one of said first and second parts of said casing such that rotation of said inner shaft member within said hollow portion causes pivotal motion between said parts with said frictional material providing lower friction at higher rotational speeds and higher friction at lower rotational speeds, said parts being able to be releasably positioned at plural oblique and acute pivotal orientations with respect to one another due to friction between said frictional material and said hollow portion.

15. A computing device according to claim 14 wherein said inner shaft member defines lateral surfaces, predetermined regions of said lateral surfaces being distanced from said outer housing member by open space therebetween, and other regions of said lateral surfaces being distanced from said outer housing member by said frictional material therebetween.

16. A computing device according to claim 14 wherein said frictional material is characterised in that it provides higher lubricity when said inner shaft member rotates within said hollow portion of said outer housing member at higher speeds, but provides lower lubricity when the rotation is at lower speeds.

17. A computing device according to claim 14 wherein said frictional material has a degree of resilience sufficient to allow said frictional material to releasably grip said outer housing member when said inner shaft member is stationary within said hollow portion of said outer housing member.

18. A computing device according to claim 14 wherein said frictional material is characterized in that it provides higher lubricity when said inner shaft member rotates within said hollow portion of said outer housing member at higher speeds, but provides lower lubricity when the rotation is at lower speeds, and wherein said frictional material has a degree of resilience sufficient to allow said frictional material to releasably grip said outer housing member when said inner shaft member is stationary within said hollow portion of said outer housing member.

19. A computing device according to claim 14 wherein said inner shaft member is provided with a locking mechanism for locking said frictional material to said inner shaft member such that said frictional material is substantially motionless with respect to said inner shaft member.

20. A computing device according to claim 14 wherein said frictional material and said inner shaft member are each provided with a locking mechanism configured to mutually engage said frictional material and said inner shaft member which causes said frictional material to be substantially motionless with respect to said inner shaft member.

21. A computing device according to claim 20 wherein said locking mechanism of said frictional material defines a hollow region shaped so as to allow said locking mechanism of said inner shaft member to fit therethrough.

22. A computing device according to claim 14 wherein each of said outer housing member and said inner shaft member is provided with a connector mechanism to allow connection of each member to a different one of said first and second parts.

23. A computing device according to claim 22 wherein said connector mechanism of said outer housing member is in the form of a lever arm that protrudes radially from said outer housing member such that application of a force to the lever arm causes said outer housing member to rotate about its axis.

24. A computing device according to claim 22 wherein said connector mechanism of said inner shaft member is in the form of a lever arm that protrudes radially from said inner shaft member such that application of a force to the lever arm causes said inner shaft member to rotate about its axis.

25. A computing device according to claim 22 wherein said connector mechanism comprises a lever arm that is transverse to the rotational axis of the outer housing member such that rotation of said slot causes said outer housing member to rotate about its axis.

26. A computing device according to claim 14 wherein said inner shaft member defines lateral surfaces, predetermined regions of said lateral surfaces being distanced from said outer housing member by space therebetween, and other regions of said lateral surfaces being distanced from said outer housing member by said frictional material therebetween, and wherein said frictional material is disposed so as to be substantially motionless with respect to said inner shaft member and is rotatable with respect to said hollow portion of said outer housing member when said inner shaft member rotates within said hollow portion, and wherein said frictional material has a degree of resilience sufficient to allow said frictional material to releasably grip said outer housing member when said inner shaft member is stationary within said hollow portion of said outer housing member, and wherein said frictional material is characterized in that it provides higher lubricity when said inner shaft member rotates within said hollow portion of said outer housing member at higher speeds, but provides lower lubricity when the rotation is at lower speeds, and wherein said frictional material has a degree of resilience sufficient to allow said frictional material to releasably grip said outer housing member when said inner shaft member is stationary within said hollow portion of said outer housing member, and wherein said inner shaft member is provided with a locking mechanism for locking said frictional material to said inner shaft member such that said frictional material is substantially motionless with respect to said inner shaft member.

* * * * *